Apr. 10, 1923.
F. GRAF ET AL
1,451,506
SELF ACTING FRICTION CLUTCH
Filed Nov. 10, 1920
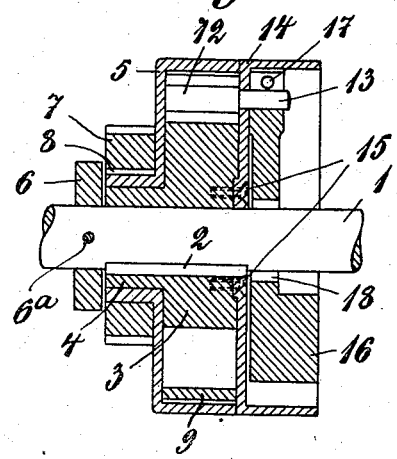
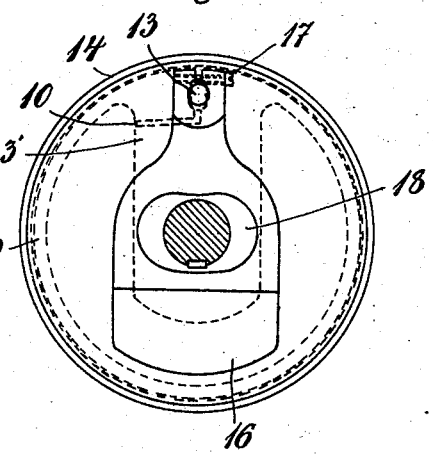
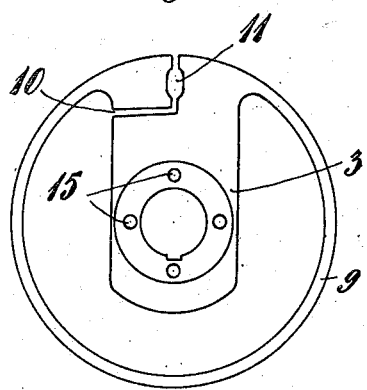
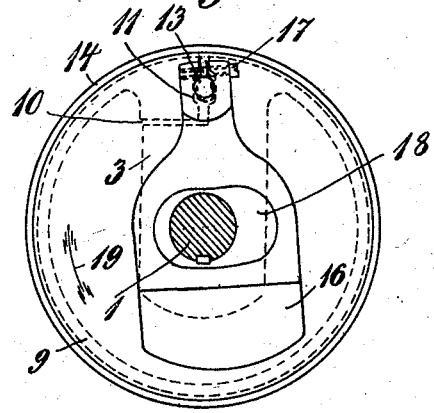
INVENTOR
FREDRIK GRAF AND
JOHN W. SVENSSON
By Otto Munk
Atty Patented Apr. 10, 1923.

1,451,506

UNITED STATES PATENT OFFICE.

FREDRIK GRAF, OF KROKSLATT, AND JOHN WALDEMAR SVENSSON, OF MOLNDAL, SWEDEN.

SELF-ACTING FRICTION CLUTCH.

Application filed November 10, 1920. Serial No. 423,133.

(GRANTED UNDER THE PROVISIONS OF THE ACT OF MARCH 3, 1921, 41 STAT. L., 1313.)

To all whom it may concern:

Be it known that we, FREDRIK GRAF, a citizen of the Canton of Thurgau of the Confederated Swiss Republic, and residing at Krokslatt, Sweden, and JOHN WALDEMAR SVENSSON, a subject of the King of Sweden, and residing at Molndal, Sweden, have invented certain new and useful Improvements in Self-Acting Friction Clutches (for which we have filed applications in Sweden, June 26, 1919, patent application Number 2942/1919; Germany, November 3, 1919, Patent Number 345570; Switzerland, November 11, 1919, Patent Number 86614; France, November 27, 1919, Patent Number 506642; Italy, patent application Number 292/2348, filed June 29, 1920; Spain, patent application Number 11882, filed July 19, 1920; England, Patent Number 176047, application filed October 25, 1920; and Belgium, patent application Number 233429, filed October 29, 1920), of which the following is a specification, reference being made to the accompanying drawing.

The present invention relates to a friction clutch, the characteristic feature of which comprises a member fixed to the driving shaft and the circumference of which consists of a divided ring that is loosely surrounded by a casing, rotatably mounted on said member and so formed, that the ring, when expanded, will be brought into contact with the casing, which forms the driven part of the clutch and which then will be rotated.

A friction clutch forming an embodiment of this invention is illustrated in the accompanying drawing, wherein Fig. 1 is a sectional elevation of the clutch. Fig. 2 illustrates the clutch seen in the longitudinal direction of the driving shaft and the parts of the same in those positions assumed when the driven part is out of engagement. Fig. 3 is an elevation of the member fixed to the driving shaft, and provided with the divided ring seen in the longitudinal direction of the shaft. Fig. 4 is a view of the clutch similar to Fig. 2 but with the parts in those positions assumed when the driven part is engaged.

Referring to the drawing, 1 designates the driving shaft, to which is fixed, for instance by means of a key 2, a collar 3 preferably provided with an extension 4, on which loosely rotates the casing 5, surrounding the collar. The casing 5 is kept in place by means of an adjusting ring 6, fixed by means of a screw $6^a$ to the shaft 1, or in any other suitable manner, and to the same is fixed the driven part or that part to which the power from the shaft 1 is to be transmitted and which on the drawing, by way of example, is shown as a gearwheel 7, fixed by means of a key 8 to the casing. The collar 3 is provided with that part, by means of which the coupling is effected and which consists of the divided ring 9 (Figure 3), the outer diameter of which is somewhat less than the inner diameter of the casing 5, surrounding the ring. The difference between said two diameters is of only such an extent, that the ring 9 normally may freely rotate inside the casing, but when slightly expanded, as being divided, will have its circumference brought into more or less secure engagement with the casing depending on the degree to which it is expanded.

The expansion of the divided ring 9 that is required in order that the same may, by friction, be coupled to the casing 5 is effected in the following way. In a suitable place in the opening 10, by means of which the ring is divided, is provided an enlargement 11 of oval or other suitable shape, for instance as shown in the drawing, and in this enlargement is fitted a pin 12 of corresponding cross section, so that, when said pin is turned, the ring must be more or less expanded, depending on how much the pin is turned, as is easily understood. Integral with the pin 12 is a pin 13 which projects into and is rotatably journalled in another casing 14, fixed to the collar 3 by means of screws 15 or any other suitable means (and thus also securely connected to the driving shaft 1) so that the opening for the pin 13 in said last named casing 14 will be in front of the enlargement 11, Fig. 3, whereby the pin 12 always will be kept in its place in the said enlargement. The means to regulate the turning of the pin 12 and thus the expansion of the ring 9 consists of a weight or balance 16, attached to the pin 13 and fastened to the same by means of a clamping screw 17. The balance, which suitably may have the shape shown on the drawing, is somewhat shorter than the inner diameter of the casing 14, where it is placed, and is provided with an opening 18 for the shaft 1 to enable the same to move to one side or the other of its central position, shown in Fig. 2.

It will be understood that the stiffness or inherent resiliency of the free portion of the ring 9 is sufficient to hold the weight 16 in the position shown in Fig. 2 until a predetermined speed of the shaft 1 is attained at which the weight will lag behind the other rotating parts. By this arrangement it will be clear that no matter what position the pin 13 occupies when the shaft 1 comes to rest the weight will be inoperative to cause the ring 9 to expand against the casing 5.

The operation of the clutch is as follows. When the shaft 1 does not rotate the balance 16 occupies the position shown in Figs. 1 and 2, the ring 9 being then not actuated by the pin 12, in consequence whereof the circumference of the same does not anywhere touch the inner circumference of the casing 5. When the shaft 1 is rotated the collar 3, ring 9, casing 14, the pins 12 and 13 as well as the balance 16, secured to the latter, are also made to rotate. The weight of the balance 16 is, however, so adjusted in relation to the flexibility of the ring 9, that the balance practically is kept in its central position, shown in Fig. 2, as long as the speed of the shaft 1 is low, but when the speed of the shaft increases and it rotates in the direction of the arrow 19, Fig. 4, the balance will, owing to its inertia, gradually be retarded, the pin 12 being then in the same degree turned and the ring 9 thus gradually expanded till the balance finally occupies the position shown in Fig. 4, when the collar 3, by the expansion of the ring 9, is securely coupled to the casnig 5 and thus the power transmitted from the shaft 1 to the gear-wheel. When the speed of the shaft 1 decreases a loosening of the coupling takes place in a similar way.

As a characteristic feature of this invention it is to be noted on the one hand that the ring 9 extends practically round the entire inner circumference of the casing 5, it being divided in only one place and having its one end connected with the collar 3 and its other end free, while on the other hand the expansion of the ring is not effected with the aid of a weight or weights being actuated by the centrifugal force but with the aid of a single, centrally positioned, weight, which during the rotation of the coupling by the increased speed changes its position owing to its being then retarded.

In the case of a shaft rotating in the direction shown on the drawing it is easily understood that the opening 10 in the ring 9 ought to be directed that way, as shown on the drawing, and the opposite way in case the shaft rotates in the other direction.

Having now described our invention, what we claim as new and desire to secure by Letters Patent is:

The combination with a driving shaft, of a clutch member comprising a split annulus having a radially disposed portion secured to said shaft, the walls of the split portion being provided with parallel channels having a common axis, a pin provided with a double cam operating between the opposite walls of the opening formed by the channels, a driven member surrounding said clutch member, and a pin operating element comprising a flat portion secured at one end to the pin and projecting to a point beyond the said shaft and receiving the latter through an arcuate opening therein, the free end of said element being provided with a weighted section adapted to cause the said element to lag behind the clutch member when the latter rotates at and beyond a predetermined speed to turn said pin and expand said annulus into engagement with the driven member.

In witness whereof we have hereunto set our hands in presence of two witnesses.

FREDRIK GRAF.
JOHN WALDEMAR SVENSSON.

Witnesses:
   Vorkm. Laaute Olsson,
   Thore Junggren.